United States Patent [19]

Markiselle

[11] Patent Number: 4,827,593

[45] Date of Patent: May 9, 1989

[54] METHOD FOR REMOVING HARD HEAD FROM CYLINDERS AND LOCKS USING TUBULAR KEYS

[76] Inventor: Frank Markisello, 91 - 10 Liberty Ave., Ozone Park, N.Y. 11417

[21] Appl. No.: 156,010

[22] Filed: Feb. 16, 1988

[51] Int. Cl.⁴ .............................................. B23P 19/02

[52] U.S. Cl. ................................ 29/426.4; 29/402.19; 29/426.5; 70/417; 70/422

[58] Field of Search ..................... 29/244, 252, 402.19, 29/426.4, 426.5, 402.06; 70/417, 422; 225/23, 24, 102; 408/72, 204, 703

[56] References Cited

U.S. PATENT DOCUMENTS

| | | | |
|---|---|---|---|
| 4,194,286 | 3/1980 | Kearns | 225/102 X |
| 4,261,093 | 4/1981 | Steffen et al. | 29/426.4 |
| 4,307,983 | 12/1981 | Blough et al. | 29/426.4 X |
| 4,339,863 | 7/1982 | Block | 29/426.4 |
| 4,586,233 | 5/1986 | Markisello | 29/426.4 |
| 4,682,398 | 7/1987 | Markisello | 29/426.4 |

*Primary Examiner*—Mark Rosenbaum
*Assistant Examiner*—Frances Chin

[57] ABSTRACT

A method for removing the hard head from the center core of cylinders and locks using tubular keys, is provided and consists of using the head breaker tool having an aperture with a guide key to go over the hard head of center core, two flat surfaces to engage a standard open and wrench for turning hard head tool to break hard head from center core giving clear access for easy drilling to gain entry through said cylinders and locks.

2 Claims, 2 Drawing Sheets

METHOD FOR REMOVING HARD HEAD FROM CYLINDERS AND LOCKS USING TUBULAR KEYS

BACKGROUND OF THE INVENTION

1. Field of Invention

The instant invention relates generally to lock cylinders and locks which use tubular keys and more specifically it relates to a method of and apparatus for removing the hard head from the center core so the center core can be easily drilled to gain entry through said locks and cylinders.

2. Description of the Prior Art

Numerous locks and cylinders have been provided in prior art that are adapted to be used for numerous applications using tubular keys. There is nothing on the market today that will remove the hard head from the center core of said cylinders and locks.

Since there is no prior art units suitable for the particular purpose stated above, there is a need for the present invention as described herein.

SUMMARY OF THE INVENTION

A principal object of the present invention is to provide a method of removing the hard head from the center core of cylinders and locks using tubular keys. The hard head prevents anyone from drilling or pulling the center core to gain entry. Using a head breaker tool, insert said tool into the keyway, take an open end wrench or a similar device, slide it over the end of the head breaker tool and apply steady turning pressure. The hard head will break away from the center core giving easy access to the center core for drilling to open said cylinder or lock.

A further object is to provide a method of removing the hard head from the center core using a head breaker tool which is economical in cost to manufacture.

A still further object is to provide a method of removing the hard head from the center core, using a head breaker tool which is simple and easy to use.

To the accomplishment of the above and related objects, this invention may be embodied in form illustrated in the accompanying drawings, attention being called to the fact however that the drawings are illustrative only, and that changes may be made in specific construction illustrated and described within the scope of the appended claims.

BRIEF DESCRIPTION OF THE DRAWING FIGURES

DETAILED DESCRIPTION OF THE PREFERRED EMBODIMENTS

Figure 4:
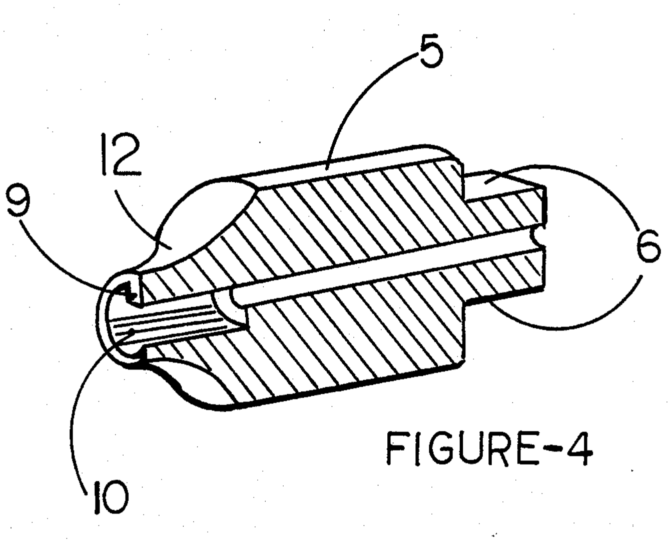
FIG. 4 is a perspective view of the breaker tool of the present invention taken along a plane which passes through the center axis of the tool.
Figure 5:
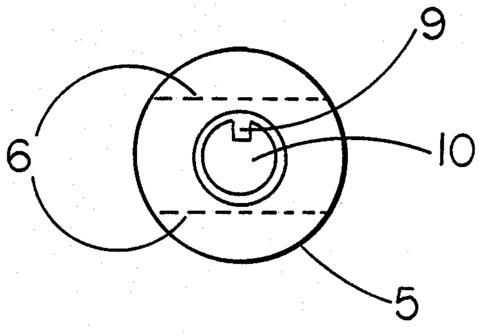
FIG. 5 is an end view of the breaker tool of the present invention taken toward the end of the tool which enters the lock.

Turning now descriptively to the drawings in which similar reference characters denote similar elements throughout the several views, FIGS. 4 and 5 best illustrate the basic parts of the invention being the head breaker tool 5 having cylindrical projection 12, guide key S extending radially inwardly from the cylindrical projection flat surfaces 6, aperture 10 to fit over hard head 3.

FIGS. 4 and 5 illustrate a head breaker tool 5 including a guide key S, flat surface 6, and an aperture 10.

Figure 1:
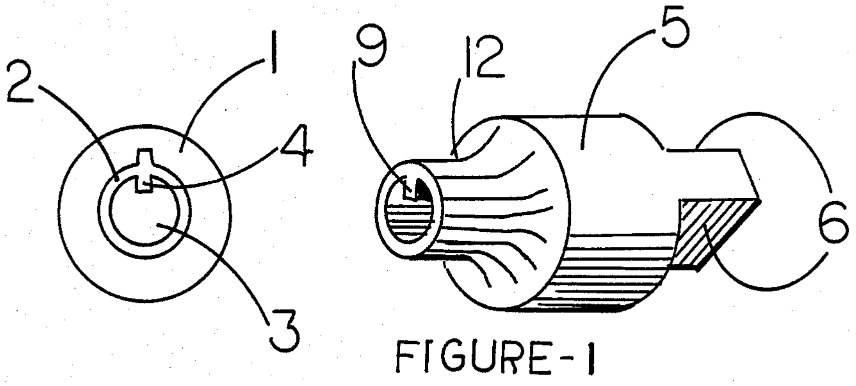
FIG. 1 is a perspective view of the head breaker tool being inserted into the keyway.
Figure 2:
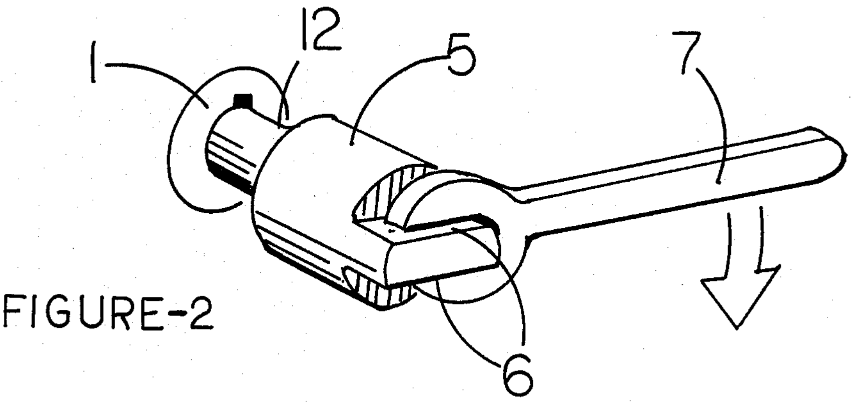
FIG. 2 is an exploded perspective view of an open end wrench slid over the two flat surfaces at rear of the head breaker tool and slight turning pressure being applied.
Figure 3:
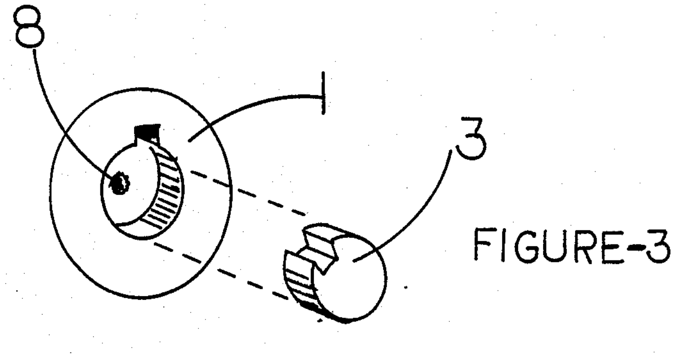
FIG. 3 is an exploded perspective view of the hard head removed from the center core of a lock.

To understand how the head breaker tool 5 is used, the following steps are described and illustrated in FIGS. 1 through 3 for removing the hard head from the center core in said cylinders and locks using tubular keys.

1. Insert the head breaker tool 5 into keyway 2, on face of cylinder or lock 1, over hard head 3, using slot 4 to accept guide key S.

2. Slide an open end wrench over two flat surfaces 6, at rear of head breaker tool 5, apply slight turning pressure on open end wrench 7.

3. Hard head 3 once removed from center core 8, provides clear access to center core 8 for easy drilling to gain entry through said cylinders and locks.

What is claimed is:

1. A method for removing a hard head from a center core of a lock of the type which is opened with a tubular key and includes a cylindrical keyway and a slot intersecting said keyway, comprising:

providing a head breaker tool including a cylindrical projection and a guide key extending radially inwardly from said cylindrical projection;

sliding said cylindrical projection of said head breaker tool within said cylindrical keyway such that said guide key is positioned within said slot; and turning said head breaker tool about the longitudinal axis of said cylindrical projection, thereby turning and removing said hard head from center core.

2. A method as defined in claim 1 including the steps of engaging said head breaker tool with a wrench, and applying pressure to said wrench to turn said head breaker tool about said longitudinal axis.

* * * * *